(12) United States Patent
Li

(10) Patent No.: US 10,185,428 B2
(45) Date of Patent: Jan. 22, 2019

(54) PRESSURE SENSING STRUCTURE AND A TOUCH-CONTROL APPARATUS

(71) Applicant: SHENZHEN NEW DEGREE TECHNOLOGY CO., LTD., Guangdong (CN)

(72) Inventor: Hao Li, Guangdong (CN)

(73) Assignee: SHENZHEN NEW DEGREE TECHNOLOGY CO., LTD, Shenzhen, Guangdong (CN)

( * ) Notice: Subject to any disclaimer, the term of this patent is extended or adjusted under 35 U.S.C. 154(b) by 91 days.

(21) Appl. No.: 14/910,689

(22) PCT Filed: Aug. 14, 2014

(86) PCT No.: PCT/CN2014/084365
§ 371 (c)(1),
(2) Date: Feb. 6, 2016

(87) PCT Pub. No.: WO2016/023203
PCT Pub. Date: Feb. 18, 2016

(65) Prior Publication Data
US 2016/0246420 A1    Aug. 25, 2016

(51) Int. Cl.
G06F 3/041    (2006.01)
G01L 1/14     (2006.01)
G01L 1/20     (2006.01)

(52) U.S. Cl.
CPC ............ *G06F 3/0414* (2013.01); *G01L 1/146* (2013.01); *G01L 1/205* (2013.01)

(58) Field of Classification Search
CPC ..... G06F 3/0414; G06F 3/041; H01H 25/041; H01H 2239/052; H03K 17/9622; G01L 1/205; G01L 1/146
See application file for complete search history.

(56) References Cited

U.S. PATENT DOCUMENTS 8,826,748 B2    9/2014  Nakamura et al.
2005/0052436 A1 3/2005  Nishiyama
(Continued)

FOREIGN PATENT DOCUMENTS

CN    102809451    12/2012

OTHER PUBLICATIONS

A Notice of the First Office Action dated Feb. 21, 2017, issued by the State Intellectual Property Office of the People's Republic of China (SIPO) in corresponding Chinese Application No. 201480007575.4 (7 pages) with partial translation (2 pages).
(Continued)

Primary Examiner — Robert J Michaud
(74) Attorney, Agent, or Firm — Nixon & Vanderhye PC

(57) ABSTRACT

The present invention provides a pressure sensing structure and a touch-control apparatus. The pressure sensing structure comprises a substrate divided into a strain-concentrating region and a region outside of the strain-concentrating region, and sensors arranged at a central portion or an edge of the strain-concentrating region, wherein a thickness of the substrate at the strain-concentrating region is smaller than that of the region outside of the strain-concentrating region. Thus, the pressure-concentrating region is pressure sensitive and has obvious strain, so that a detectable electrical signal can be generated when a pressure is applied to the surface of the substrate. More specifically, the touch-control apparatus comprises at least one pressure sensing structure. The pressure sensing structure can be operated flexibly. It is easy to control its cost. It is suitable for environments with high requirements for dust control and security, and it has wide applications.

23 Claims, 5 Drawing Sheets

(56) References Cited

U.S. PATENT DOCUMENTS

| | | | | |
|---|---|---|---|---|
| 2009/0194404 A1* | 8/2009 | Kubo | ................... | G06F 3/0414 |
| | | | | 200/5 D |
| 2012/0304778 A1* | 12/2012 | Nakamura | .............. | G01L 5/228 |
| | | | | 73/778 |
| 2013/0126325 A1* | 5/2013 | Curtis | ................ | H03K 17/9622 |
| | | | | 200/5 A |
| 2014/0338462 A1 | 11/2014 | Nakamura et al. | | |

OTHER PUBLICATIONS

A Notice of the Second Office Action dated Sep. 11, 2017, issued by the SIPO in corresponding Chinese Application No. 201480007575.4 (7 pages) with partial translation (3 pages).
Chinese Grant dated Dec. 21, 2017, issued by the SIPO in corresponding Chinese Application No. 201480007575.4 (1 page) with partial translation (1 page).

* cited by examiner

PRESSURE SENSING STRUCTURE AND A TOUCH-CONTROL APPARATUS

TECHNICAL FIELD

The present invention relates to the technical field of touch control and, more particularly, relates to a pressure sensing structure and a touch-control apparatus.

BACKGROUND

Along with the drastic development of intelligent electronic products in recent years, touch screens and touch-sensitive buttons have been extensively applied to a plurality of electronics and other relevant products. By virtue of their characteristics of having a visualized human-machine interface, being easy to operate and to define virtually, these products have more humanized operations and more diverse functions. The applications of touch screens and touch buttons become wider and wider. These products are required to have more functionalities and high reliability, in order to be applicable to more circumstances. Existing touch screens and touch buttons are of various types, such as capacitive, resistive, infrared or surface acoustic touch screens or touch buttons. By detecting the variations in capacitances, resistances, infrared signals, and/or surface acoustic waves before and after each touch operation, these touch button or touch screens are able to identify touched positions. However, practically, such touch devices have certain limitations, such as low reliability, being unable to detect pressure values, specific input mechanism, and restricted applications in conductive mediums, for example, metal, and so on.

To solve the problem, there exists a pressure-sensitive touch button or touch screen, which has high reliability and flexible input mechanisms, is applicable to any elastic medium, and can detect pressure values. Thus, it can be used in a touch control apparatus with high requirements. However, since a pressure sensing touch screen or touch button detects a pressed position and a pressure value by detecting the strain of a medium, it is limited by the strength and thickness of the medium, for example, if the medium is thick and strong, it would be hard to detect a gentle touch operation. As a result, a detected touch operation may not be smooth.

SUMMARY OF THE INVENTION

The present invention has been made in consideration of the above situations. One aspect of the present invention is to provide a pressure sensing structure, in order to solve the problem involving certain limits in the strength and thickness of a medium used in pressure sensing touch screens or touch buttons, thereby breaking their limits in manufacturing and application.

One aspect of the invention provides a pressure sensing structure. The pressure sensing structure comprises a substrate and pressure sensors. The substrate includes a strain-concentrating region and a region outside of the strain-concentrating region of less strain capability. The pressure sensors are disposed close to the strain-concentrating region and/or within a pressure-sensible region. The thickness of the substrate within the strain-concentrating region is smaller than that of the substrate within the region outside of the strain-concentrating region.

Preferably, the substrate is integrally formed and comprises plastic, metal, wood or glass.

Preferably, the substrate comprises elastic or rigid material.

Preferably, the strain-concentrating region includes at least one groove formed by indenting the backside of the substrate, and, a region in the strain-concentrating region of the substrate corresponding to the groove is relatively thinner than the other region of the strain-concentrating region.

Preferably, a groove group is formed by multiple grooves within the strain-concentrating region, the groove group comprises a central groove that is located in the center of the strain-concentrating region and an edge groove that is located at an edge of the strain-concentrating region. The central groove is of a cross shape, an X shape, a circular shape, a ring shape, a radiation shape, or the shape of the Chinese character 'mi', and the edge groove is of a fan shape, a ring shape, a circle shape, an oval shape or a polygon shape. The central groove and the edge groove are either connected or not connected with each other.

Preferably, the groove group comprises multiple grooves that are uniformly or non-uniformly distributed, or of a mesh shape.

Preferably, two or more serially connected sensors are disposed within or close to the strain concentrating region. At least one sensor is disposed in the center of the strain-concentrating region, and the sensor connects in series with the other sensor(s) to form a bridge circuit.

Preferably, one sensor is disposed at a central position of the strain-concentrating region of the substrate.

Preferably, the sensors can be variable resistors, capacitors, electric-inductance strain sensors, stress sensors or polymer strain sensors.

Preferably, the pressure sensing structure further comprises a medium layer that is attached closely to the backside surface of the substrate, and the sensors are disposed between the medium layer and the substrate, between medium layers or under a lower surface of the medium layer, within or adjacent to the strain-concentrating region at the backside of the substrate.

Preferably, A touch-control apparatus includes one or more touch buttons and/or one or more touch screens, wherein each touch button includes the above-described pressure sensing structure; and/or each touch screen includes at least one such pressure sensing structure described above.

Another aspect of the present invention is to provide a touch control device including a touch button and/or a touch screen, wherein the touch button includes the pressure sensing structure described above, and/or the touch screen includes at least one pressure sensing structure as described above.

Compared to existing techniques, example embodiments of the present invention bring the following advantages.

1. A groove is provided on a surface of the substrate. When the substrate is pressed, the groove concentrates the generated strain force into areas close to it, thereby making it easy for the sensor facing the groove to detect the strain of the medium layer. As the strain is mainly generated in areas close to the groove, the strength of the strain is only related to the thickness of the groove provided on the substrate, so that the detected strain by the strain sensing structure will not be affected by the overall thickness of the substrate. As a result, it can be used for touch screens or touch buttons of any thickness and of any mediums, thereby reducing production expenses and eliminating the limits of the selection of mediums for touch screens or touch buttons. Moreover, it is no longer necessary to exert a large force on touch screens or touch buttons comprising thick-mediums, and their operations could be even more flexible.

2. Since the pressure sensing structure senses pressures, it would not be limited by any particular mode of touch, for example, the touches could be finger touches, stylus touches, touches by conductors or touches by gloved fingers etc., and its precision would not be influenced by the interference of a charged medium.

3. One aspect of the present invention provides a pressure sensing structure or a touch-control apparatus wherein, its substrate can be made by various types of elastic materials, including metal, glass or plastics, or rigid materials with extremely high elasticity modulus, as long as the material can deform elastically. The material selection of the substrate is flexible and its application scope is wide.

4. The pressure sensing structure can detect pressure values, so that it can be widely used in various fields, for example, it can be used not only in pressure sensing touch screens or touch buttons, but also in weight measuring devices or other related devices through calibrations.

5. When grooves are formed on the back surface of the substrate, the front surface of the substrate is a complete surface without any slots and seams, so the substrate is suitable for environments with high requirements for dust-control and safety, etc.

DESCRIPTION OF EXEMPLARY EMBODIMENTS

Embodiments of the present invention will now be described with reference to the drawings. Specifically, all the Embodiments described herein shall be for explanation use only without proposing any restricting qualifications for the present invention.

Detail illustrations will be provided based on example embodiments of the present invention in the following paragraphs.

Figure 1:
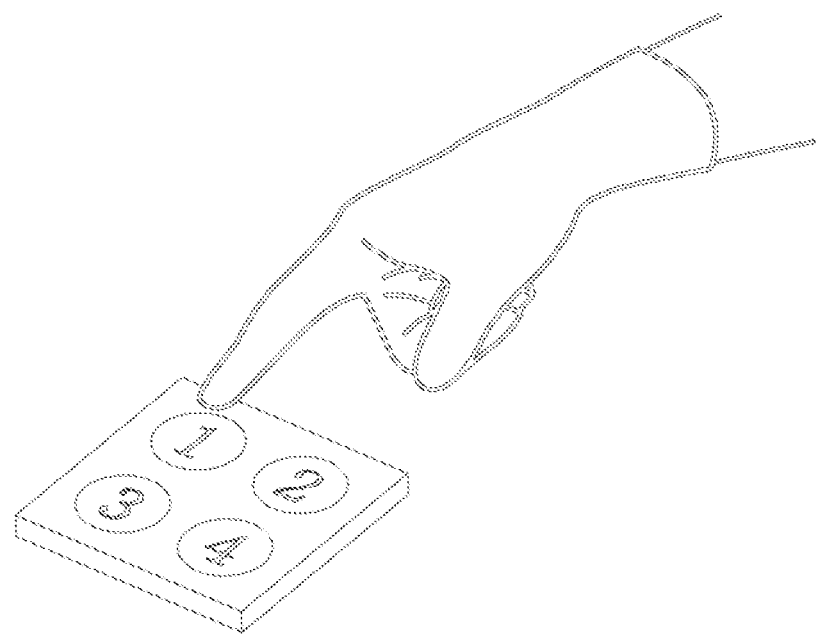
FIG. 1 is a perspective view illustrating an example electronic apparatus comprising an example pressure sensing structure according to the present invention.
Figure 2:
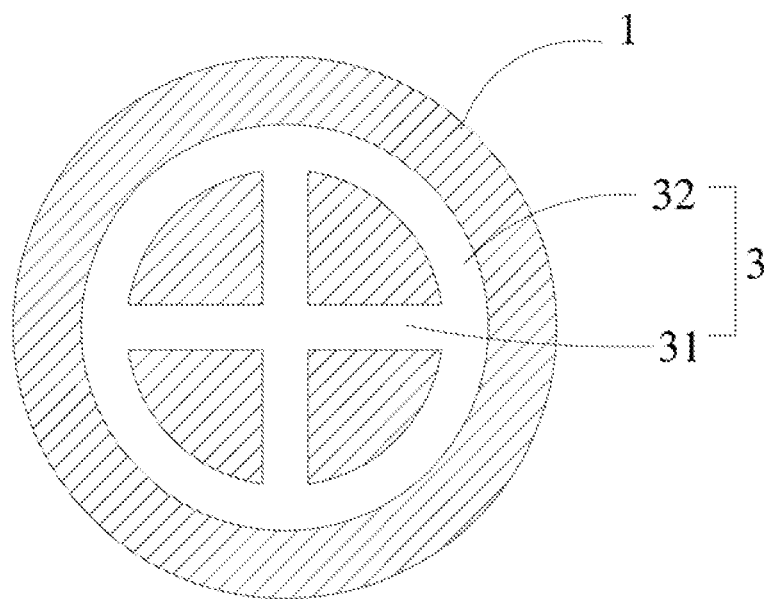
FIG. 2 is a plan view showing the back surface of an example pressure sensing structure according to the present invention (1)
Figure 3:
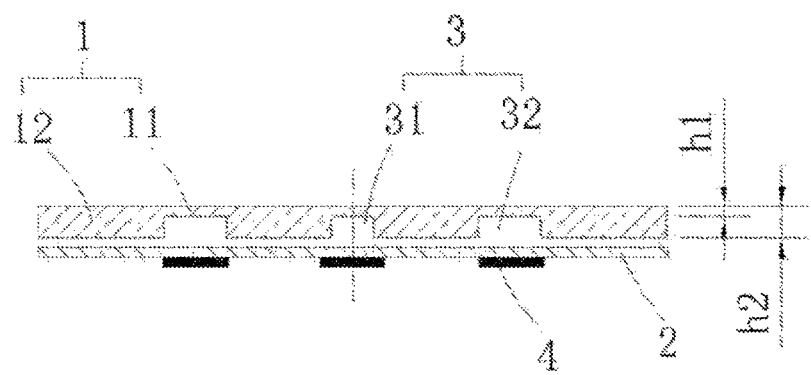
FIG. 3 is a cross-sectional view of the example pressure sensing structure shown in FIG. 2.

As shown in FIGS. 1-3, in a preferred exemplary pressure sensing structure comprises a pressure-sensitive substrate 1 with a strain-concentrating region, a medium layer 2, and strain sensors 4. The substrate 1 and the medium layer 2 are integrated together via a liquid glue, a solid glue, a glue film, a UV glue or by means of injection molding. The substrate 1 comprises a strain-concentrating region 11 and a region 12 outside of the strain-concentrating region 11. The strain sensors 4 are arranged near or within the strain-concentrating region 11. A substrate thickness h2 of the region 12 outside of the strain-concentrating region 11 is larger than a substrate thickness h1 of the strain-concentrating region 11. The strain-concentrated region 11 is pressure-sensitive, has obvious strain, and can concentrate strain, so that it can isolate the pressures applied to this region from those applied to the region 12 outside of the strain-concentrating region 11. As a result, an enhanced electrical signal can be output by the strain sensors 4. At least one groove is provided on one side of the substrate 1 (a front side or a backside). In this embodiment, a groove group 3 including several grooves is arranged on the substrate 1. The strain-concentrating region 11 comprises the groove group 3 and other thin regions on the substrate 1 that are sensitive to pressures and can centralize strain. A region of the front surface of the substrate 1 corresponding to the strain-concentrating region is considered as a touch operation interface, which can be used as a user interface. Two or more of the strains sensors 4 are arranged in series connection on front side or backside of the medium layer 2, and at least one of the strain sensors 4 is placed within the strain-concentrating region 11, specifically, in this embodiment referring to the region corresponding to the groove group 3. A preferred position to place sensors is at the central part of the groove group 3. In this example force sensing structure, the purpose of forming the groove group 3 on the substrate 1 is to alter the pressure distribution of the substrate 1. When a user touches the substrate 1, a certain amount of force is exerted on the substrate 1. By virtue of the existence of the groove group 3, when the substrate is pressed, the produced strain on the substrate is concentrated in regions near the groove group 3, such that a region of the medium layer 2 directly facing the groove group 3 is more likely to deform compared to the other regions. As a result, the strain sensors 4 disposed within that region can sense the deformation and generate a signal corresponding to the deformation. The generated signal can be used to identify the touch position and calculate a pressure value. The force sensors 4 may be disposed between medium layers 2, at the backside of the medium layer 2, or within or near the strain-concentrating region 11 on the back surface of the substrate 1.

Figure 4:
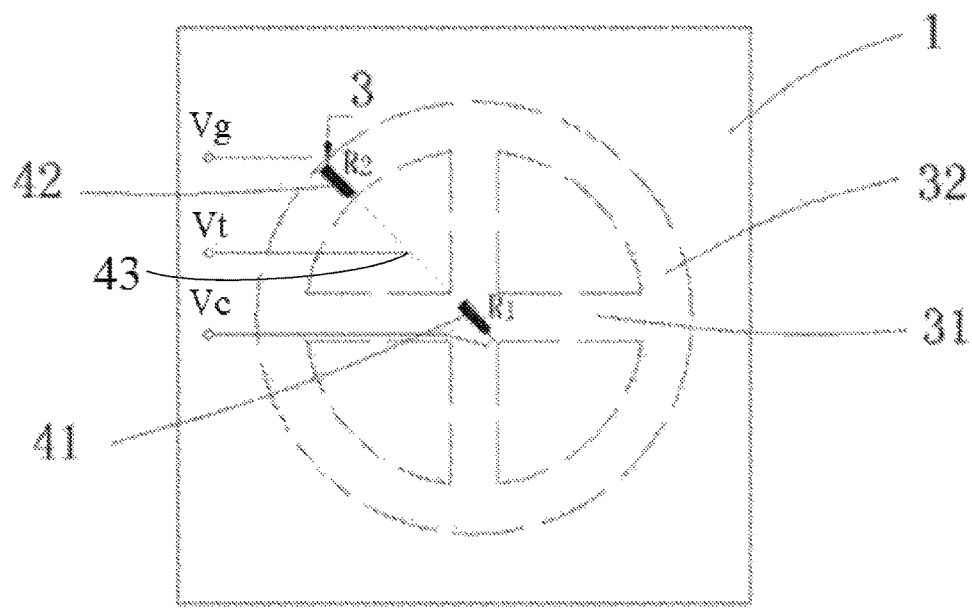
FIG. 4 shows a schematic view of a circuit of strain sensors in an example pressure sensing structure according to the present invention.

More specifically, with reference to FIG. 4, two force sensors 4 are deformable resistors. One of the force sensors 4 (a first force sensor 41) is disposed on a region corresponding to the groove group 3, and is serially connected with another one of the strain sensors 4 (a second force sensor 42). Moreover, these two sensors form a bridge circuit. That is, fixed voltages are applied to two ends of the serially connected first force sensor 41 and second force sensor 42, and a voltage detection end 43 is led out at an intermediary point between the first force sensor 41 and the second force sensor 42. In an example embodiment, the second force sensor 42 can be disposed on a region directly facing the groove group 3, or other regions. In some example embodiments, one end of the second force sensor 42 can be ground-linked (Vg), one end of the first force sensor 41 is connected with a high voltage (Vc), and the output voltage (Vt) can be detected between these two ends. In general, when the substrate 1 is pressed, the groove group 3 area experiences a larger strain force than that of the other areas of the substrate, and hence the deformation of a portion of the medium layer 2 in association with the first force sensor 41 is larger than that of the other portions of the medium layer 2. Such that, the first force sensor 41 will be stretched, which contributes to an increased resistance of the first force sensor 41, while the second force sensor 42 will be compressed, which contributes to a reduced resistance of the second force sensor 42. As a result, the output voltage value Vt decreases. By detecting, calculating and evaluating the variations of Vt, the position and pressure value of a user's touch can be acquired. In the embodiment of the invention, it is only required to ensure that at least one of the force sensors 4 is arranged directly below the groove group 3 to sense the deformation generated by a touch, the other force sensors 4 may not be arranged at the region corresponding to the groove group 3, and a change of the detection voltage Vt can be detected as long as the one of the strain sensors 4 directly facing the groove group 3 deforms. Specifically, the touched region and the size of the touched area can be calculated according to the detected Vt variation of relevant positions, realizing the functionality of the touch button. Moreover, in another example embodiment, a more accurate touch position and size of a touched area can be obtained by further detecting variations of a series of relevant Vt in nearby regions and then performing interpolation calculations, thereby achieving the functionality of the touch screen. Although in a preferred example embodiment of the present invention, a bridge circuit is used, other kinds of circuit structures and analysis algorithms can also be used to obtain a touch position and a touch pressure as well.

1. Additional explanations: strain sensors can not only be variable resistors, but also be capacitors, electric-inductance and other forms of strain sensors which can change along with the strain vibrations. The above explanation is for purpose of understanding.

2. Additional explanations: detecting circuits are not restricted to a single-bridge circuit consisted of two circuits in series connection. Functions can also be accomplished by a single sensor, (for example, by detecting the variations of its circuit current) or a multi-bridge circuit comprising several single circuits that is capable of detecting variations of strain sensors.

3. Additional explanations: possible structures of the substrate are described with reference to FIG. 2, FIG. 5, FIG. 6, FIG. 7, FIG. 8 and so on.

Example embodiments of the present invention provide certain advantages compared to existing techniques, as described below.

1. The Groove group 3 is arranged on the surface of the substrate 1, when the substrate is pressed, the produced strain on the substrate is concentrated in regions near the groove group 3. As the strain is mainly generated in areas close to the groove, the strength of the strain is only related to the thickness of the groove provided on the substrate, so that the detected strain by the strain sensing structure will not be affected by the overall thickness of the substrate 1. Accordingly, it can be used for touch screens or touch buttons of any thickness and of any mediums, thereby reducing production expenses and eliminating the limits of the selection of mediums for touch screens or touch buttons. Moreover, it is no longer necessary to exert a large force on touch screens or touch buttons comprising thick-mediums, and the operation could be even more flexible.

2. Since the pressure sensing structure senses pressures, it would not be limited by any particular mode of touch, for example, the touches could be finger touches, stylus touches, touches by conductors or touches by gloved fingers etc., and its precision would not be influenced by the interference of a charged medium.

3. The substrate 1 is only required to have elastic deformation performance so it can be made by various types of elastic materials, including metal, glass or plastics, or rigid materials with extremely high elasticity modulus, as long as the material can deform elastically. The material selection of the substrate is flexible and its application scope is wide.

4. The pressure sensing structure can detect pressure values, so that it can be widely used in various fields, for example, it can be used not only in pressure sensing touch screens or touch buttons, but also in weight measuring devices or other related devices through calibrations.

5. When grooves are formed on the back surface of the substrate 1, the front surface of the substrate is a complete surface without any slots and seams, so the substrate is suitable for environments with high requirements for dust-control and safety, etc.

In certain example embodiments of the present invention, the groove group 3 can be formed on the back surface of the substrate 1, and the front face of the substrate 1 is a flat surface without any slots, and therefore the substrate is suitable for environments with high requirements for dust-control and safety, etc. Alternatively, the groove group 3 can also be arranged on the front surface of the substrate 1.

In certain example embodiments of the present invention, the number and shape of the groove group 3 are not strictly limited, so that it can be spread over the entire surface area of substrate 1 to avoid concentrating in a small region. The groove group 3 can be in various regular or irregular shapes including a circular shape, an oval shape, a ring shape, a cross shape, a radiation shape, a square shape, a sector shape or a polygonal shape and so on. Moreover, multiple groove groups can be in the same shape or in different shapes, and several example embodiments will be described as followings.

In a first example embodiment with reference to FIG. 2 and FIG. 3, the groove group 3 includes a central groove 31 located at an inner portion of the substrate 1 and an edge groove 32 adjacent to an edge portion of the substrate 1. The central groove 31 is a cross-shape groove, the edge groove 32 is a ring-shape groove, and they are mutually interconnected. One of the strain sensors 4 is arranged in a region directly facing the central groove 31, another one of the strain sensors 4 is arranged in a region directly facing the edge groove 32, and these two sensors form a bridge circuit.

Figure 5:
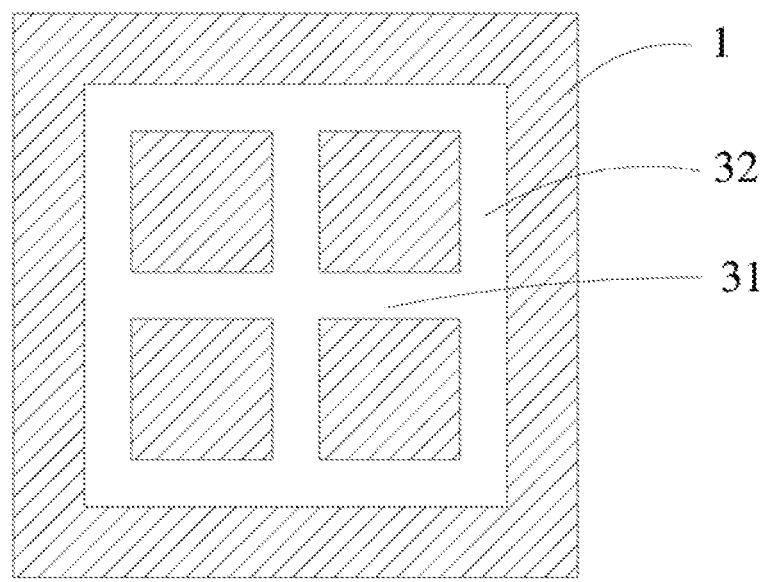
FIG. 5 is a plan view showing the back surface of an example pressure sensing structure (2)

In a second example embodiment with reference to FIG. 5, the central groove 31 is a cross-shaped groove or an X-shaped groove, while the edge groove 32 is a square-shaped groove, and they are mutually interconnected. This example embodiment can be used in situations where touch buttons are relatively dense. In another example embodiment, the edge groove 32 can be a polygon-shaped slot.

Figure 6:
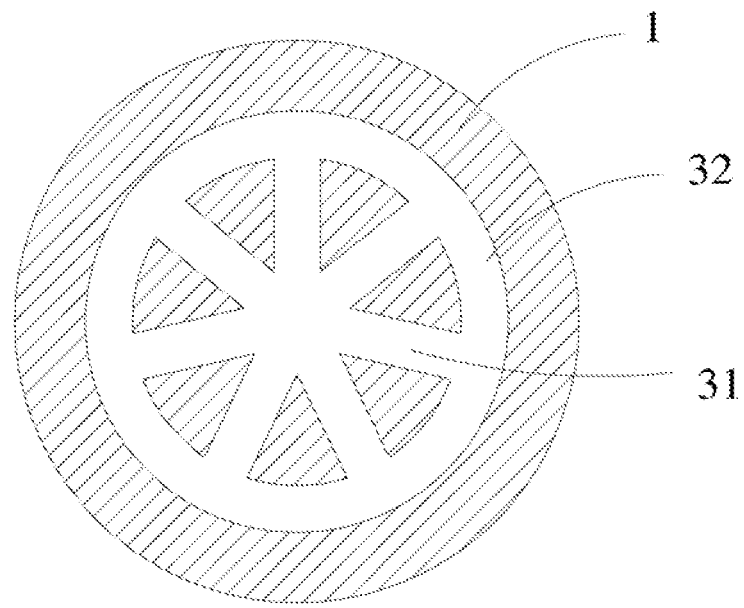
FIG. 6 is a plan view showing the back surface of an example pressure sensing structure according to the present invention (3)

In a third embodiment with reference to FIG. 6, the central slot 31 is a radiation-shaped groove or is in the shape of the Chinese character 'mi', while the edge groove 32 is a circular groove, and they are mutually interconnected. Specifically, the number of rays of a radiation-shaped groove can be one, two or more.

Figure 7:
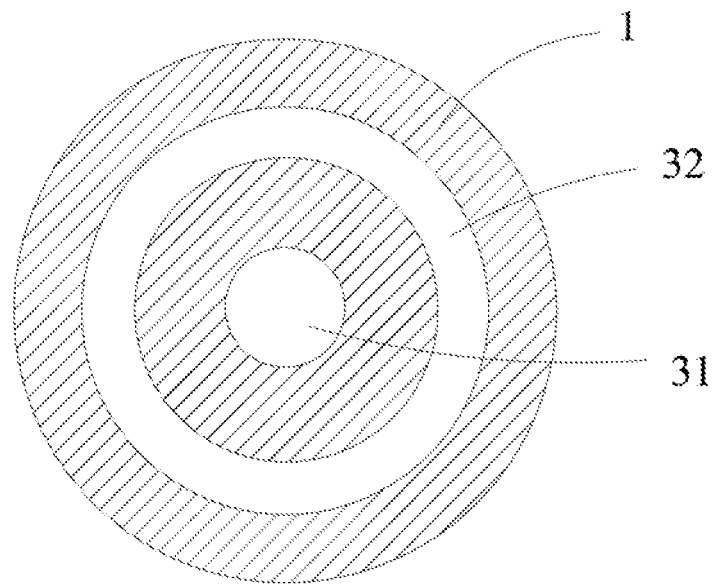
FIG. 7 is a plan view showing the back surface of an example pressure sensing structure (4)

In a fourth embodiment with reference to FIG. 7, the central groove 31 is a circular groove, while the edge groove 32 is a ring-shaped groove.

Figure 8:
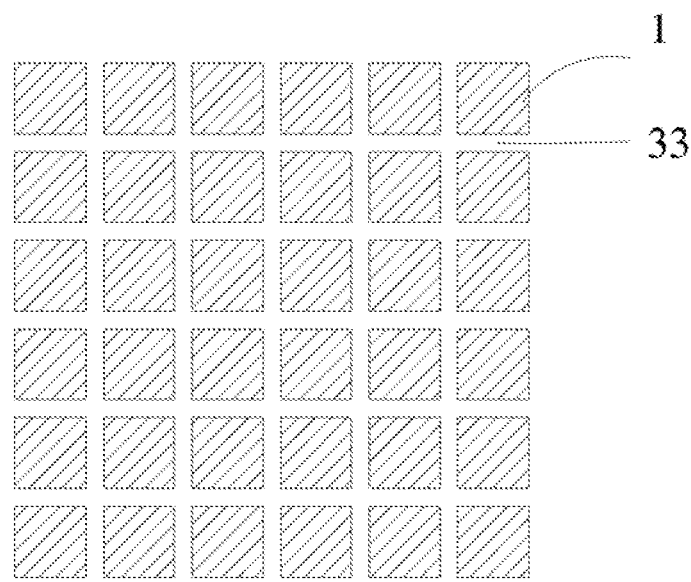
FIG. 8 is a plan view showing the back surface of an example pressure sensing structure (5)

In a fifth embodiment with reference to FIG. 8, the groove group 3 is a grid-shaped groove of an array structure, while each of the strain sensors 4 (Not shown in Figures) is distributed in an area adjacent to a grid unit 33. The strain at each groove is detected through a bridge circuit, and the touched position and the pressure value are calculated, and therefore a multiple-point control can be achieved. This structure is suitable for large touch screens with many touch buttons.

Figure 9:
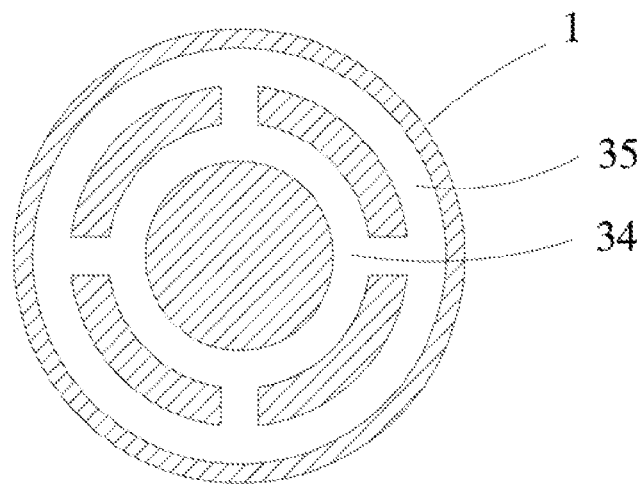
FIG. 9 is a plan view showing the back surface of an example pressure sensing structure (6)
Figure 10:
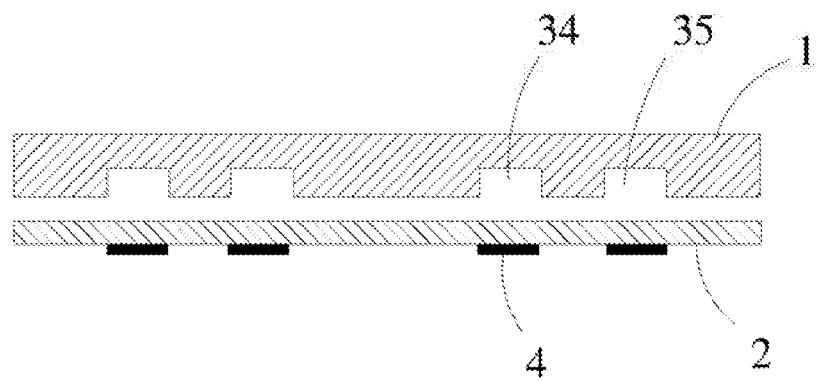
FIG. 10 is a cross-sectional view of the example pressure sensing structure shown in FIG. 9.

In a sixth embodiment with reference to FIG. 9 and FIG. 10, the groove group 3 includes an inner groove 34 getting close to an edge of the substrate 1 and an outer ring groove 35. One of the strain sensors 4 is arranged in a region directly facing the inner groove 34 and another one of the strain sensors 4 is disposed on a region directly facing the outer-ring groove 35. In certain example embodiments, some of the strain sensors 4 may also be disposed on regions not facing any grooves. Two of these strain sensors 4 may form a bridge circuit. More specifically, the inner-ring groove 34 and the outer-ring groove 35 can be a circular groove or a square groove, etc. The structure is also suitable for large touch screens with many touch buttons, and a multiple-point control can be achieved.

In a non-limiting, exemplary embodiment of the present invention, the substrate 1 comprises plastic, metal, glass, and the like materials with elastic deformation, rigid materials with high resilient modulus, materials which can be elastically deformed, or other materials that are pressure-sensitive and can concentrate strain to achieve the function of pressure sensing. In this embodiment, the substrate 1 is integrally formed including the strain-concentrating region 11 and the region 12 outside of the strain-concentrating region 11. The substrate 1 may comprise transparent material(s) to make the entire substrate 1 transparent, or only the non-slotted regions of it comprises transparent material(s) to make the substrate 1 transparent in the middle, or to show an LCD and the like, and hence the structure can be applied to touch control products requiring light transparency and display functions, enabling wide applications.

Figure 11:
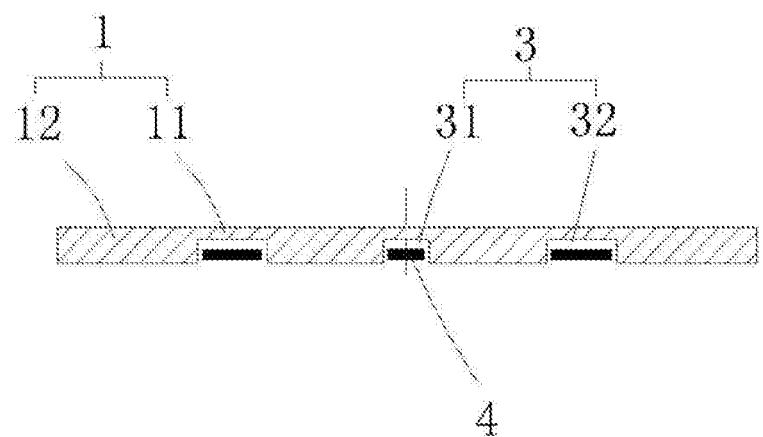
FIG. 11 provides a cross-sectional view of another example pressure sensing structure.

In another example pressure sensing apparatus, with reference to FIG. 11, the strain sensor 4 is directly disposed on the strain-concentrating region 11 without the medium layer 2.

Example pressure sensing devices in this disclosure are mainly used in touch buttons and touch screens. In addition to the pressure sensing structure of a single touch button or a single unit of a touch button described above, the present invention also provides a touch control mechanism including the above-disclosed pressure sensing structure, which includes a touch button or a touch screen or both, wherein the touch button adopts the above-disclosed pressure sensing structure, and the touch screen includes a plurality of above-disclosed pressure detection structures distributed in an array arrangement. Furthermore, several groups of strain sensors can also be included in the same pressure sensing structure, in which a touch function is realized by interpolation calculations. This kind of touch control mechanism is also within the scope of the present invention.

The foregoing descriptions of the embodiments and their accompanying drawings of the invention are intended to illustrate and not to limit this invention. Various changes and modifications may be made to the embodiments without departing from the spirit of the invention. Therefore, the scope of the invention is to be limited only by the appended claims.

What is claimed is:

1. A force sensing structure comprising:
    a substrate comprising at least a first area, a second area and other areas, the first and second areas of the substrate having smaller thickness than the other areas of the substrate;
    a medium layer integrated with the substrate; and
    at least first and second force sensors disposed within the medium layer or on a medium layer surface not in contact with the substrate, the first force sensor being provided within the a medium layer or on the medium layer surface at a region at least partially aligning with the first area, the second force sensor being provided within the medium layer or on the medium layer surface at a region at least partially aligning with the second area;
    wherein the substrate is structured to transmit applied force to the medium layer, and the first and second force sensors are structured to sense deformation of the medium layer in response to the applied force.

2. The force sensing structure according to claim 1, wherein the substrate comprises plastic, metal, wood or glass.

3. A touch-control apparatus includes one or more touch buttons and/or one or more touch screens, wherein each touch button includes the force sensing structure according to claim 2; and/or each touch screen includes at least one force sensing structure according to claim 2.

4. The force sensing structure according to claim 1, wherein the substrate comprises elastic or rigid material.

5. A touch-control apparatus includes one or more touch buttons and/or one or more touch screens, wherein each touch button includes the force sensing structure according to claim 4; and/or each touch screen includes at least one force sensing structure according to claim 4.

6. The force sensing structure according to claim 1, wherein the first and second areas include at least one groove formed by deformation from a side of the substrate.

7. A touch-control apparatus includes one or more touch buttons and/or one or more touch screens, wherein each touch button includes the force sensing structure according to claim 6; and/or each touch screen includes at least one force sensing structure according to claim 6.

8. The force sensing structure according to claim 6, wherein the groove comprises a groove group comprising a central groove that is located in an inner portion of the groove group and an edge groove that is located in an edge portion of the groove group, wherein the central groove is in a cross shape, an X shape, a circular shape, a ring shape, a radiation shape, or the shape of the Chinese character 'mi' connecting with or isolated from the edge groove, the edge groove having a-shape of a-fan, ring, circle, oval or polygon.

9. A touch-control apparatus includes one or more touch buttons and/or one or more touch screens, wherein each touch button includes the force sensing structure according to claim 8; and/or each touch screen includes at least one force sensing structure according to claim 8.

10. The force sensing structure according to claim 8, wherein the first area includes the center groove of the groove group, and the second area includes the edge groove of the groove group.

11. The force sensing structure according to claim 8, wherein the groove group comprises multiple grooves that are arranged uniformly or non-uniformly in a grid-shape distribution.

12. A touch-control apparatus includes one or more touch buttons and/or one or more touch screens, wherein each touch button includes the force sensing structure according to claim 11; and/or each touch screen includes at least one force sensing structure according to claim 11.

13. The force sensing structure according to claim 11, wherein two or more series-connected sensors are located at a region of the medium layer aligning with the first area, including at least one sensor located at a position of the medium layer aligning with a central position of the first area which constitutes a bridge circuit with the other series-connected sensors.

14. A touch-control apparatus includes one or more touch buttons and/or one or more touch screens, wherein each touch button includes the force sensing structure according to claim 13; and/or each touch screen includes at least one force sensing structure according to claim 13.

15. The force sensing structure according to claim 1, wherein a region of the medium layer aligning with the first area comprises only a single sensor located at a position aligning with a central position of the first area.

16. A touch-control apparatus includes one or more touch buttons and/or one or more touch screens, wherein each touch button includes the force sensing structure according to claim 15; and/or each touch screen includes at least one force sensing structure according to claim 15.

17. The force sensing structure according to claim 1, wherein the first and second force sensors comprise variable resistors, capacitors, electric-inductance strain sensors, stress sensors or polymer strain sensors.

18. A touch-control apparatus includes one or more touch buttons and/or one or more touch screens, wherein each touch button includes the force sensing structure according to claim 17; and/or each touch screen includes at least one force sensing structure according to claim 17.

19. The force sensing structure according to claim 1, wherein the medium layer is attached closely to a surface of the substrate via a liquid glue, a solid glue, a glue film, a UV glue or by means of injection molding.

20. A touch-control apparatus includes one or more touch buttons and/or one or more touch screens, wherein each touch button includes the force sensing structure according to claim 19; and/or each touch screen includes at least one force sensing structure according to claim 19.

21. A touch-control apparatus includes one or more touch buttons and/or one or more touch screens, wherein each touch button includes the force sensing structure according to claim 1; and/or each touch screen includes at least one force sensing structure according to claim 1.

22. The force sensing structure of claim 1 wherein the first force sensor and the second force sensor deform differently as in response to deformation of the medium layer.

23. The force sensing structure of claim 22 wherein the first force sensor stretches with the medium layer while the second force sensor compresses with the medium layer.

* * * * *